United States Patent [19]

Johnson

[11] Patent Number: 4,641,455

[45] Date of Patent: Feb. 10, 1987

[54] SONIC FISHING BAIT

[76] Inventor: Carl T. Johnson, 5716 Abbott Ave. South, Minneapolis, Minn. 55410

[21] Appl. No.: 777,920

[22] Filed: Sep. 19, 1985

[51] Int. Cl.⁴ ............................................. A01K 85/01
[52] U.S. Cl. .................................. 43/42.13; 43/42.31; 43/42.37; 43/42.5
[58] Field of Search ................. 43/42.31, 42.13, 42.37, 43/42.5, 42.52

[56] References Cited

U.S. PATENT DOCUMENTS

| 958,233 | 5/1910 | Curtis | 43/42.37 |
| 1,636,904 | 7/1927 | Elwood | 43/42.5 |
| 2,877,592 | 3/1959 | Basgall | 43/42.37 |
| 3,299,562 | 1/1967 | Bennecke | 43/42.31 |
| 3,568,351 | 1/1969 | Perrin | 43/42.31 |
| 3,604,140 | 9/1971 | Nelson | 43/42.13 |
| 4,202,127 | 5/1980 | Marek | 43/42.31 |

Primary Examiner—Nicholas P. Godici
Assistant Examiner—Christopher L. McKee
Attorney, Agent, or Firm—Kinney & Lange

[57] ABSTRACT

A fishing bait especially designed for jig fishing in which there is a vane pivotally secured at an intermediate portion of the shank portion of the fishing bait, the vane pivotally swinging back and forth between two spaced protuberances so as to alternately engage them to produce sound waves. The protuberances may be in the form of beads secured to and surrounding the shank portion of the bait. Or, the protuberances may be in the form of outwardly bent portions of the shank portion of the bait. The upper of the protuberances is preferably smaller than the lower one. The vane preferably has at least one aperture therethrough to allow water to pass through the vane and thus increase the ease with which the vane can move back and forth between the protuberances. The vane is preferably of metal and of a thickness of between 0.018 and 0.023 inches. The bait has a hook portion as well as a shank portion, and the hook portion and the shank portion are shown as being integral with each other.

7 Claims, 5 Drawing Figures

SONIC FISHING BAIT

BACKGROUND OF THE INVENTION

1. Field of the Invention

The present invention is concerned with a sonic fishing bait suitable for jig fishing. A movable vane moves up and down between two protuberances, successively engaging them to produce sound waves to attract the fish.

2. Description of the Prior Art

Various patents have been concerned with producing some sort of sound in connection with a fishing bait. For example, the Johansson U.S. Pat. No. 3,363,358 shows a vane which moves back and forth as the bait is raised and lowered. The problem with this arrangement is that the vane swings on a relatively flat plate and has to travel through a very large arc to engage this plate when moving upwardly. Consequently, the likelihood of producing any appreciable sound is not as great as it should be. Johansson is primarily concerned with the visual effect of the moving vane rather than the sonic effect.

The Strader U.S. Pat. No. 3,987,576 shows an arrangement in which there is a spinner 26 which is disposed between two protuberances, but in which it is very unlikely to ever engage at least one of them. While Strader is concerned with making a sound, he provides an auxiliary weight which moves back and forth within a conical housing to produce this effect.

The Bessler U.S. Pat. No. 3,220,139 shows a fishing bait in which a popping sound is produced. The popping sound is produced by a sliding member movable upon a shank of a fishing bait.

The Cameron U.S. Pat. No. 1,857,939 shows a slidable weight, but it is primarily intended for changing the attitude of the bait as it is moved through the water. It is supposed to produce an action very similar to that of a diving fish.

The Mancusi U.S. Pat. No. 2,794,287 shows two parts which move back and forth with respect to each other. There is apparently no particular reference to the production of sound. Again, this patent is more concerned with the movement of the lure that results from the relative movement of the two parts.

SUMMARY OF THE INVENTION

The present invention is concerned with a sonic fishing bait particularly designed for jigging and which comprises a hook portion and a shank portion, the shank portion having a pair of spaced protuberances and a vane pivotally secured at one end to the shank portion between the protuberances and free to pivotally move from engagement with one protuberance into engagement with the other protuberance so that when the bait is used for jigging by moving it up and down, the vane alternately engages the protuberances to produce sound waves. The protuberances are preferably in the form of beads secured to the shank portion and surrounding the shank portion. In an alternate form, the protuberances may be formed of an outwardly bent portion of the shank portion of the bait.

The vane preferably has at least one aperture through it to allow water to pass through the vane and thus increase the ease with which the vane can move back and forth between the protuberances as the fishing line is raised and lowered. I have found it desirable to make the vane of metal with a thickness between 0.018 and 0.023 inches. If the thickness of the metal is substantially greater than 0.023 inches, the noise produced is a relatively dull thud. If it is much thinner than 0.018 inches, the sound produced is of insufficient volume.

The vane may be secured to an arcuate portion secured to the shank portion and projecting outwardly from it away from the hook.

The vane preferably is sufficiently long with respect to the spacing of the two protuberances that the vane projects beyond each protuberance by a distance equal to at least one-half the length of the vane. In this way, it is possible for it to be a large surface to be engaged by the water to cause the vane to move between the protuberances.

The shank portion is preferably integral with the hook portion for simplicity of manufacture.

Other objects and features of the invention will be apparent from a consideration of the accompanying specification, claims and drawing.

DETAILED DESCRIPTION OF THE PREFERRED EMBODIMENTS

Figure 1:
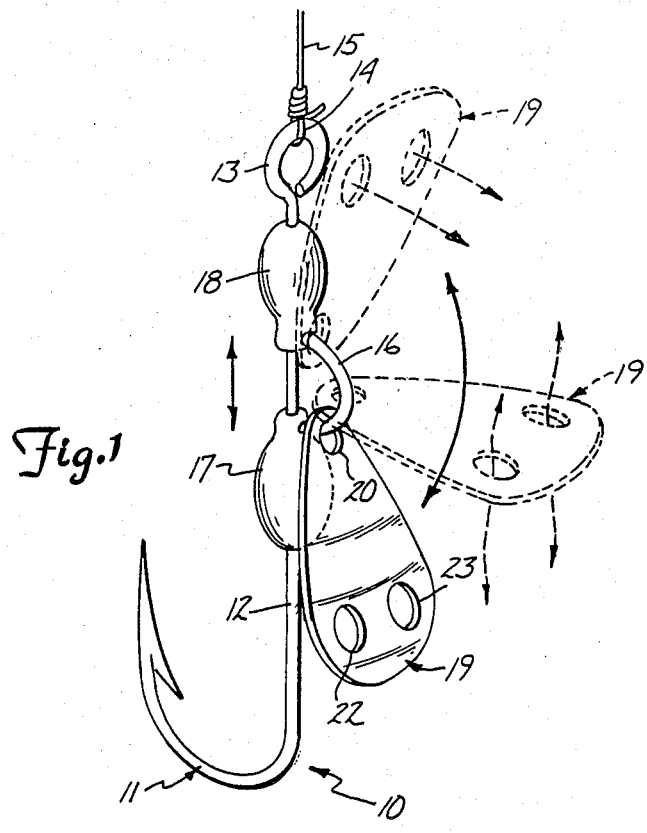
FIG. 1 is a perspective view of the improved fishing bait showing the vane in various dotted line positions.

Referring to FIG. 1, the fishing bait, generally indicated by the numeral 10, is shown as comprising a hook portion 11 and a shank portion 12. In the form shown, these are integral with each other. The shank portion is provided with the usual eye 13 at its upper end. The eye 13 is designed to have a fishing line 15 secured thereto. Any suitable arrangement can be employed for connecting the line 15 to the eye 13. Normally, of course, a swivel connection is incorporated into the connections.

Referring to the fishing bait, an arcuate member 16 is secured, as by soldering, to the shank portion 12 at an intermediate part thereof. Mounted on the shank portion 12 and soldered thereto adjacent the inner ends of the arcuate portion 16 are a pair of spaced beads 17 and 18. These beads may be brass hollow beads. The upper bead 18 is preferably smaller than the lower bead 17.

A vane 19 has an aperture 20 through its inner end, the arcuate member 16 extending through this aperture. In forming the device, it is preferable to put the arcuate portion 16 through the opening 20 of the vane 19 and then to fasten the arcuate portion 16 to the shank portion 12. The upper bead 18 is threaded over the hook portion 11 and moved upwardly on the shank portion 12. The arcuate member 16 is then placed in position on the shank portion. The lower bead 17 is then threaded over the hook portion 11 and is moved up on the shank portion until it engages the arcuate portion. The two beads 17 and 18 and the arcuate member 16 are then soldered to the shank portion 12 and the upper portion of the bait, including the two beads and the arcuate member 16, are then painted to cover the various solder joints.

Figure 2:
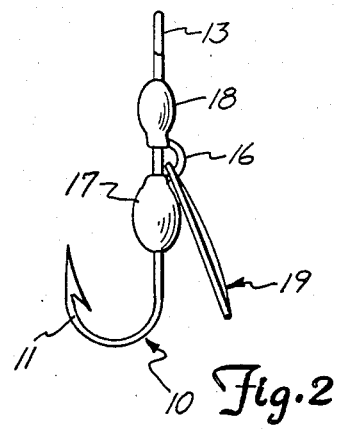
FIG. 2 is a side elevational view of the fishing bait.

As will be readily apparent, the vane 19 is pivotally secured on the arcuate member 16 and is free to move up and down. This is shown by various dotted line positions of the vane 19. The vane preferably has two openings 22 and 23 therethrough. As will be noted from the drawing, the inner end of the vane which is secured to the arcuate member 16 is relatively narrow. The vane is progressively widened until it terminates in a curved outer edge. Preferably, as shown in FIG. 2, the vane 19 is bowed slightly.

In use, the hook portion 11 has a suitable bait secured thereto. The fishing bait of the present invention is then lowered into the water to the desired depth. The fisherman then moves the line 15 up and down periodically. When the fishing bait is lowered, the vane 19 swings upwardly to the upper dotted line position of FIG. 1. When it is raised again, the vane goes back to the full line position of FIG. 1. When it is in its upper position, it engages the bead 18. When it is in its lower position, it engages the bead 17. The result is that a sound impulse is produced each time that the vane engages one of the beads 17 and 18. The primary sound impulse is produced when the vane engages the lower larger bead 17. The sound impulse produced by engagement of the vane with the upper bead 18 is, however, a significant factor in the overall sonic effect created by the fishing bait.

As has been explained earlier, the apertures 32 and 33 allow water to pass through the vane and thus increase the ease with which the vane can move back and forth between the protuberances. Obviously, this affects the frequency of the sound waves.

MODIFICATION OF FIGS. 4 AND 5

Figure 3:
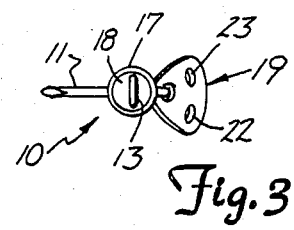
FIG. 3 is a top plan view of the improved fishing bait.
Figure 4:
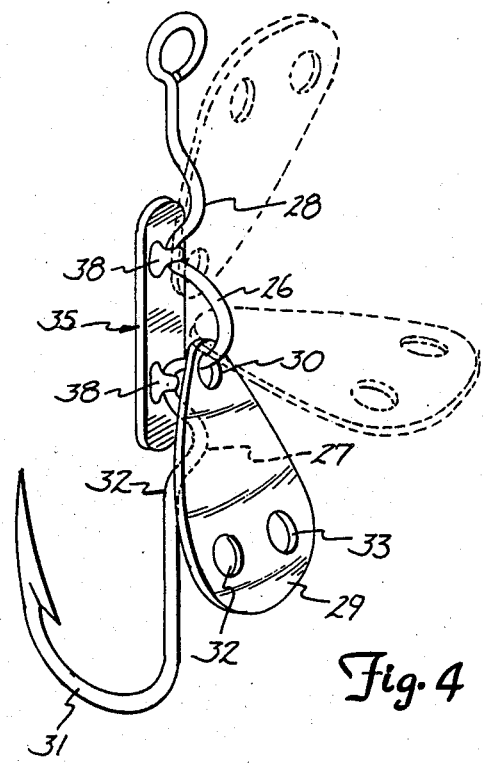
FIG. 4 is a perspective view similar to FIG. 1, but showing a modified form of the fishing bait.
Figure 5:
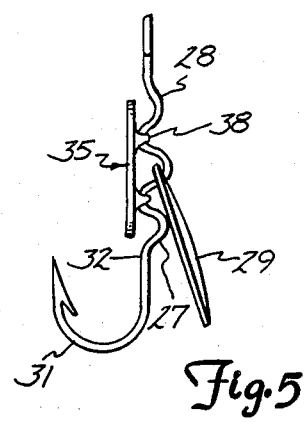
FIG. 5 is a side elevational view of the modification of FIG. 4.

The arrangement of FIGS. 4 and 5 is similar to that of FIGS. 1 through 3, with the exception that instead of having separate bead members 17 and 18, the shank of the hook is bent to provide two separate protuberances against which the vane moves. Referring specifically to the drawing, a shank portion 32 of the hook has a lower bent portion 27 corresponding in function to bead 17. There is also an upper bent portion 28 corresponding to the upper bead 18 of the modification of FIGS. 1 through 3. The shank is bent at an intermediate portion to form an arcuate loop 26 to perform the function of the arcuate member 16. The vane 29 is pivotally mounted on this intermediate arcuate portion 26. Again, as with the previously described species, there are two openings 32 and 33 to facilitate the passage of water through the vane 29 as it moves up and down. There is also an opening 30 which is threaded over the arcuate member 26. The bait has a hook portion 31 as well as a shank portion 32. Since the protuberances 27 and 28 are only on one side and do not surround the shank 12, it is necessary to provide a further plate 35 which extends between the inwardly bent portions of the shank 32 adjacent the inner ends of the protuberances 27 and 28. This plate 35 serves to prevent the vane 29 from rotating to the point where it would not engage effectively with the two protuberances 27 and 28. The plate 35 may be fastened to the shank portion 32 by any suitable fastening means such as solder indicated at 38. This is done after the vane has been threaded over the hook portion 31, the outwardly bent portion 27 and onto the loop 26.

The arrangement of FIG. 4 requires special forming apparatus for the hook. In large quantities, it could be manufactured more cheaply than the arrangement of FIGS. 1 through 3, although the arrangement of FIGS. 1 through 3 is easier to manufacture because it uses standard components.

The effect of the arrangement of FIGS. 4 and 5 is exactly the same. The vane 29 simply moves up and down between the two protuberances 27 and 28, successively engaging them. Each time it engages one of the protuberances, a sound impluse is produced.

CONCLUSION

It has been found that with both of the modifications of FIGS. 1 through 3 and that of FIGS. 4 and 5, the attention of the fish to the fishing bait, when jig fishing is being done, is greatly increased. As is well known, any sound travels very effectively through water. The combination of the visual effect produced by the swinging vane plus the sound waves produced by the vane successively engaging the upper and lower protuberances is very effective in attracting fish to the bait.

While I have shown certain specific embodiments of my invention for purposes of illustration, it is to be understood that the scope of the invention is limited solely by that of the appended claims.

What is claimed is:

1. A fishing bait comprising a hook portion and a shank portion, said shank portion having upper and lower protuberances and an arcuate part projecting out from the longitudinal axis of the shank portion between the protuberances, said protberances and arcuate part being fixedly secured to, or integral with, said shank portion, a vane pivotally secured at one end thereof to said arcuate part between the protuberances and free to pivotally move from engagement with one protuberance into engagement with the other protuberance so that when said bait is used for jigging by moving it up and down the vane alternately engages the probuterances to produce sound waves, said vane having at least one aperture therethrough in the portion of the vane extending beyond the protuberances to allow water to pass through the vane to increase the ease with which the vane can move back and forth between the protuberances and hence to affect the frequency of the sound waves.

2. The fishing bait of claim 1 in which each protuberance is in the form of a bead secured to and surrounding the shank portion.

3. The fishing bait of claim 1 in which each protuberance is in the form of an outwardly bent portion of the shank portion of the bait.

4. The fishing bait of claim 1 in which the upper of the protuberances is smaller than the lower of the protuberances.

5. The fishing bait of claim 1 in which the vane is of metal and the thickness of the vane is between 0.018 and 0.023 inches.

6. The fishing bait of claim 1 in which the vane when in engagement with one of the protuberances extends beyond said protuberance by a distance equal to at least one-half the length of the vane.

7. The fishing bait of claim 1 in which the hook portion and the shank portion are integral with each other.

* * * * *